United States Patent [19]

Aggelen

[11] Patent Number: 5,123,552
[45] Date of Patent: Jun. 23, 1992

[54] STACKING TROLLEY AND TABLE INTENDED FOR SUCH A TROLLEY

[75] Inventor: Johannes V. Aggelen, Wageningen, Netherlands

[73] Assignee: Feralkon B. V., Bennekom, Netherlands

[21] Appl. No.: 682,258

[22] Filed: Apr. 8, 1991

[51] Int. Cl.[5] .................................................. A47F 5/00
[52] U.S. Cl. ..................................... 211/194; 211/126; 211/188
[58] Field of Search ............... 211/194, 188, 186, 187, 211/133, 126; 280/793, 47, 35; 108/91, 111

[56] References Cited

U.S. PATENT DOCUMENTS

| | | | |
|---|---|---|---|
| 3,620,176 | 11/1971 | Ferinand et al. | 211/186 X |
| 4,099,472 | 7/1978 | Kellogg | 211/188 X |
| 4,275,666 | 6/1981 | Schriever | 108/111 X |
| 4,637,324 | 1/1987 | Janson | 108/111 |
| 4,706,576 | 11/1987 | James | 108/111 |
| 4,981,224 | 1/1991 | Rushing | 211/126 |
| 4,998,023 | 3/1991 | Kitts | 211/188 X |

*Primary Examiner*—Robert W. Gibson, Jr.
*Attorney, Agent, or Firm*—Young & Thompson

[57] ABSTRACT

A stacking trolley particularly used to load plants and cut flowers at the growers and to transport the loaded trolley by lorry to the auction comprises a mobile subframe 1 with a number of trays fitted thereon above one another at a mutual spacing. Each tray constitutes part of a table 2 with legs 3 and each table is provided with structure for the stable support of a corresponding table stacked thereon. The tables can easily be removed from the trolleys and placed on the floor. The plants and flowers do not have to be removed from the trays in the shop and can be displayed to the public on the tables.

14 Claims, 8 Drawing Sheets

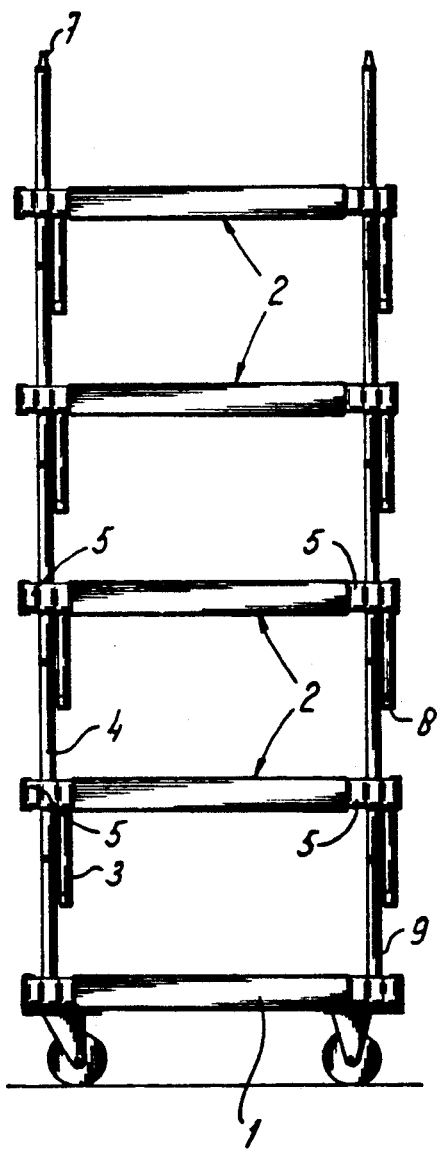
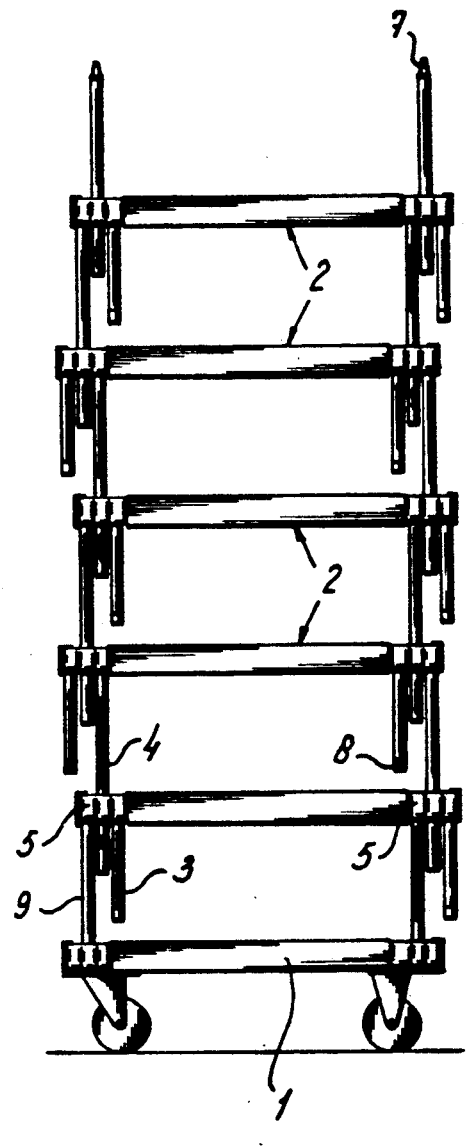

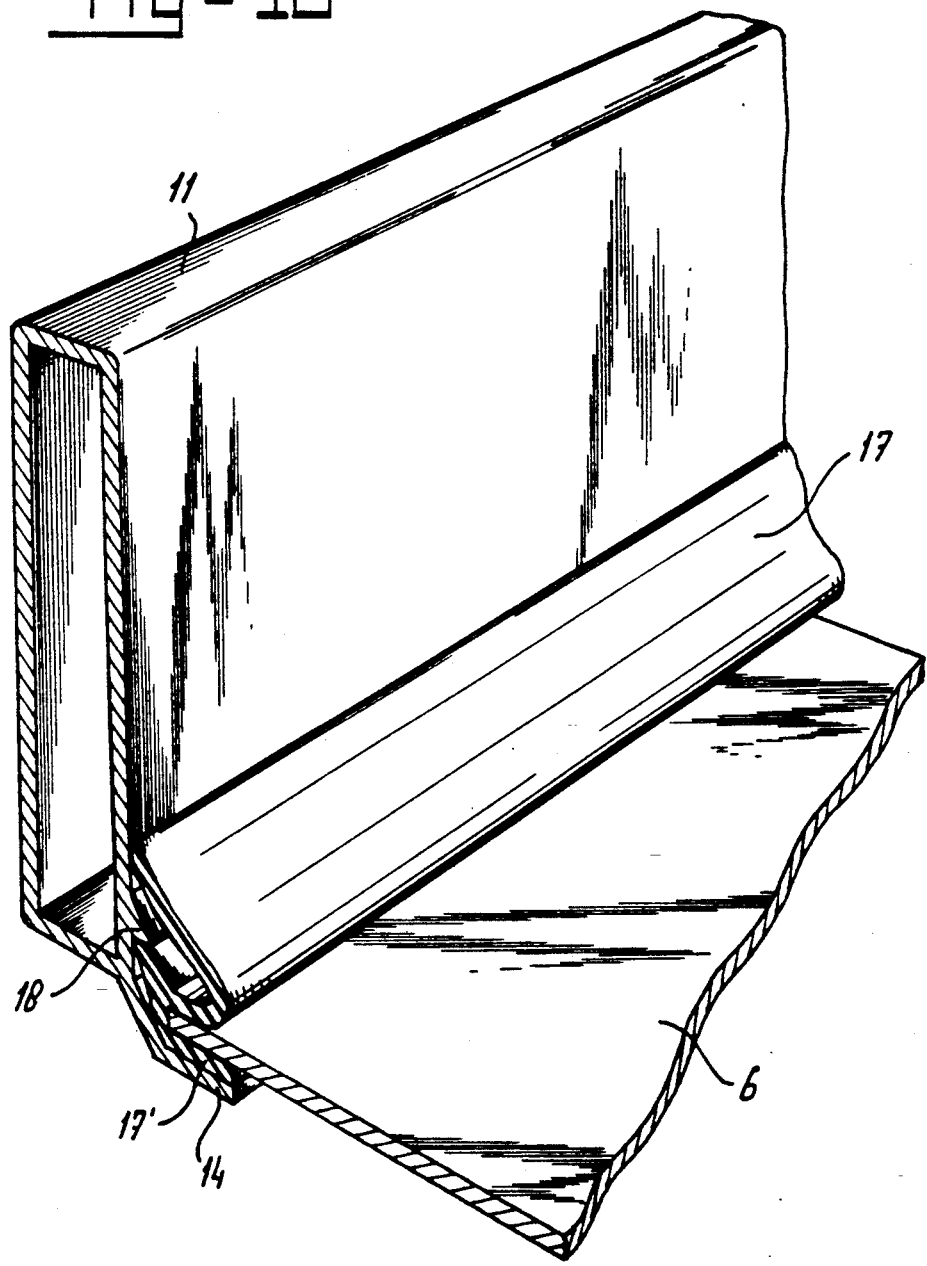

STACKING TROLLEY AND TABLE INTENDED FOR SUCH A TROLLEY

The invention relates in the first instance to a stacking trolley comprising a mobile sub-frame with a number of trays fitted thereon above one another at a mutual spacing.

A stacking trolley of this type is known from DE-A-2800575-02.

With this known trolley, bushes are fitted at the corner points of the rectangular sub-frame, the lower end of a tube-shaped upright being pushed into each bush. The uprights are provided with a number of openings sited above one another at a mutual spacing and push-in elements of the trays are hooked into these openings in such a way that the vertical spacing between the trays is adjustable. Trolleys of this type can be used to load plants and cut flowers at the growers and to transport the loaded trolleys by lorry to the auction. The loaded trolleys can be transported, with or without transfer of plants and flowers, to the wholesaler and from there to the retailer, while the plants and flowers are removed from the trays. The trolleys return to the wholesaler, auction or grower.

The object of the invention is to provide an improvement to this system such that the plants and flowers do not have to be removed from the trays in the shop and can be displayed to the public in a suitable manner.

According to the invention each tray, for this purpose, constitutes part of a table with legs and each table is provided with means for the stable support of a corresponding table stacked thereon. Of course, the stacking trolley is also suitable for products other than plants and flowers.

The tables can easily be removed from the trolleys and placed on the floor. The flowers and plants are displayed to the public on the tables, without transfer.

The said means for the stable supporting of tables stacked on one another comprise push-in elements and receiving elements (male/female).

A conical stacking stud is preferably used as the push-in element.

To enable the tables to be stacked on one another at mutually different intervals, each table is provided in the vicinity of each leg with a vertical support rod projecting above the table top.

With this construction, each said support rod can project to below the table top over a distance which is less than the length of the leg section projecting below the table top. In this case the tables can be arranged wither with their support rods on one another or with their legs on the support rods.

A similar multiple interval adjustment of the tables can also be achieved if each leg projects to above the table top over a distance which is less than the length of the support rod section projecting above the table top.

The possibility for multiple interval adjustment of the tables is further increased if each table is provided, in the vicinity of each leg and support rod, with a receiving element for receiving a push-in element at the upper end of a support rod of a table located below or for receiving the lower end of a leg of a table located above.

The sub-frame is preferably provided with vertical support rods to support a first table.

The distance over which these support rods project above the supporting tray of the sub-frame corresponds to the distance over which the support rods of the tables project above the table top.

The invention also relates to a table intended for the stacking trolley. If the table is rectangular, it will be provided at each corner point with two recesses, in one of which a table leg is secured and in the other of which a support rod is secured.

In addition, the table can be provided at each corner point with a tube-shaped receiving element into which fits the upper section of a support rod of a corresponding table located below, said upper section being provided with a push-in element.

At each corner point, the recesses can be made in a corner piece, of which projecting end sections are each incorporated in a rectangular tube profile, said tube profiles forming upright side edges of the table.

The tube profiles possess an inwardly directed flange to support a table top.

The table top must rest on the said flange in a watertight manner, for example by providing the flange with a sealing profile. This leakage can also be prevented by fitting an essentially V-shaped sealing strip on the peripheral edge strip of the table top, said sealing strip being provided with a fixing lip which rests on the flange underneath said peripheral edge strip.

To enable the legs and support rods to be fitted easily, they are secured in the recesses of a corner piece by clamping pieces which are fixed with the aid of bolts.

By providing the legs and support rods with at least two openings, the length over which the legs and support rods project with respect to the table top can be chosen.

The invention will now be explained in more detail with the aid of the figures, in which a few illustrative embodiments are shown.

FIG. 1 shows a stacking trolley with a first stack of a number of tables.

FIG. 2 shows a stacking trolley with a second stack of the said tables.

FIG. 10 shows a perspective view of a section of a table with an alternative seal of the table top with respect to the raised edge.

Figure 3:
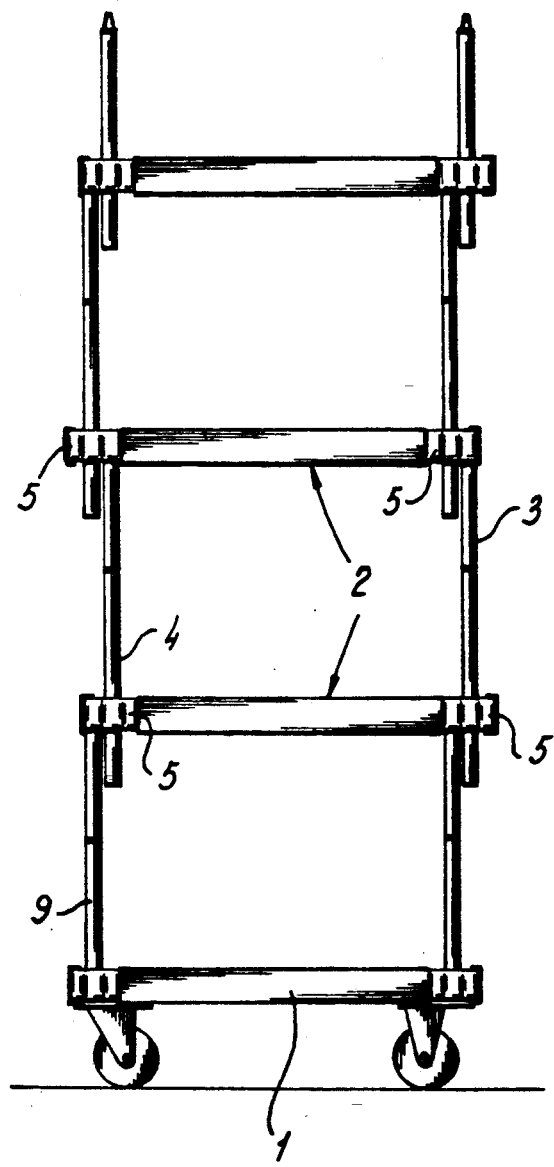
FIG. 3 shows a stacking trolley with a third stack of the said tables.

The stacking trolley according to the invention is made up of a mobile sub-frame 1 and a number of tables 2 stacked thereon. The tables are rectangular and are provided at each corner point with a table leg 3, a support rod 4 and a pipe-piece-shaped receiving element 5.

Each support rod 4 projects a relatively large distance above and a relatively small distance below the table top 6 of the particular table and is provided at the upper end with a conical stacking stud 7, which can be pushed into the lower end of a table leg 3 or the lower end of a support rod 4 or a receiving element 5.

The lower end of each leg 3 is provided with a cap 8.

At each corner point, the rectangular sub-frame 1 has a support rod 9 which projects above the supporting tray of the sub-frame over a distance which corresponds to the distance over which the support rods 4 of a table project above the table top 6.

FIGS. 1 to 3 show various stable stacking possibilities for the tables 2 on an sub-frame 1. FIG. 1 indicates that the support legs are resting on one another, the conical stacking stud 7 on the upper end of a support rod pushing into the lower end of a superposed support rod. The legs 3 and the receiving elements 5 have no function with this stacking arrangement.

FIG. 2 shows that the conical stacking stud 7 at the upper end of the support rods is pushed into a receiving element 5 of a table. The legs 3 have no function with this stacking arrangement.

FIG. 3 indicates that each leg 3 is resting on the upper end of a support rod 4, the conical stacking stud 7 pushing into the lower end of the leg 3.

It will be clear that the mutual distance between the table tops is different in the three cases shown. Of course, each of the three stacking arrangements can occur on one and the same stacking trolley, as a result of which the distance between the table tops varies.

The distance over which the support rods 4 project below a table top is less than the length of the legs 3. The distance over which the support rods 4 project above a table top is greater than the length of the legs 3.

Moreover, an alternative construction is possible with which the legs of the tables are extended to above the table top and the support rods project only above the table top, the leg section projecting above the table top being shorter than the support rod length, which, in turn, is shorter than the leg length. This alternative construction can be envisaged by turning upside down a table according to the embodiment shown.

Figure 4:
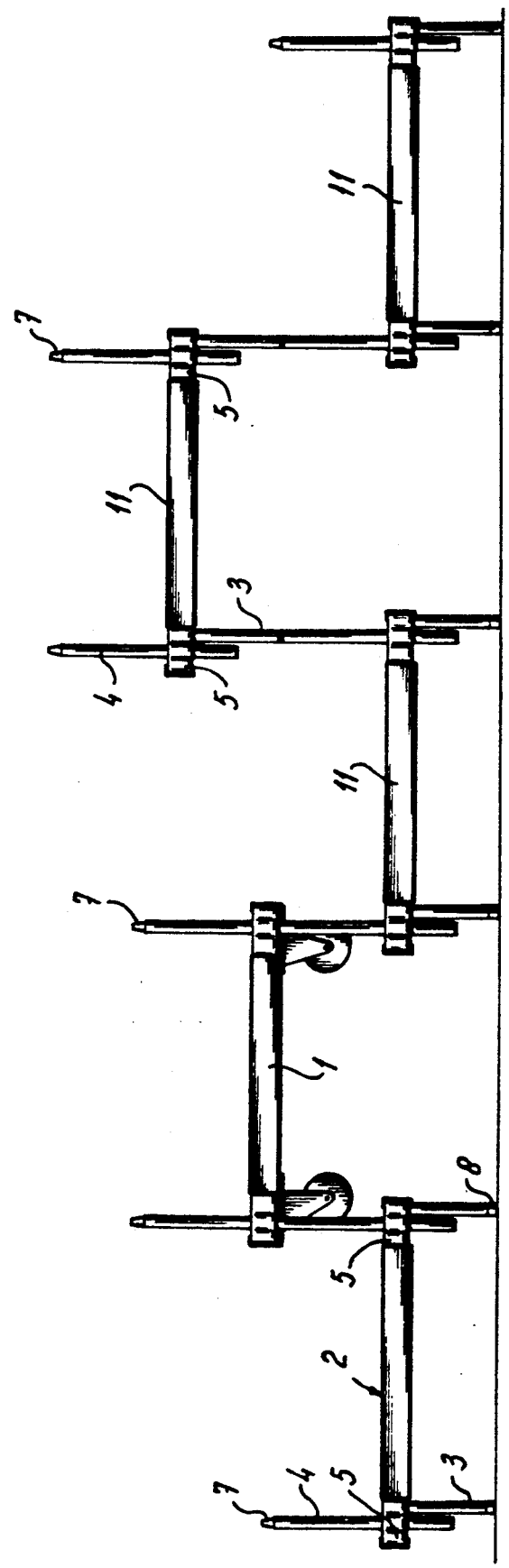
FIG. 4 shows a number of tables which are connected to one another and positioned alongside one another such that the table tops assume different heights.

FIG. 4 shows how the tables 2 and also the sub-frame 1 can be arranged alongside one another on the floor, with which arrangement the height of the table top can vary. Consequently, the flowers and plants can be presented to the public in an attractive manner without it being necessary to transfer or move the flowers and plants. After the tables, with the flowers and plants supported thereon, have been removed from the stacking trolley and positioned on the floor, they can be sprayed without being shifted, which is a not inappreciable advantage in practice.

Figure 5:
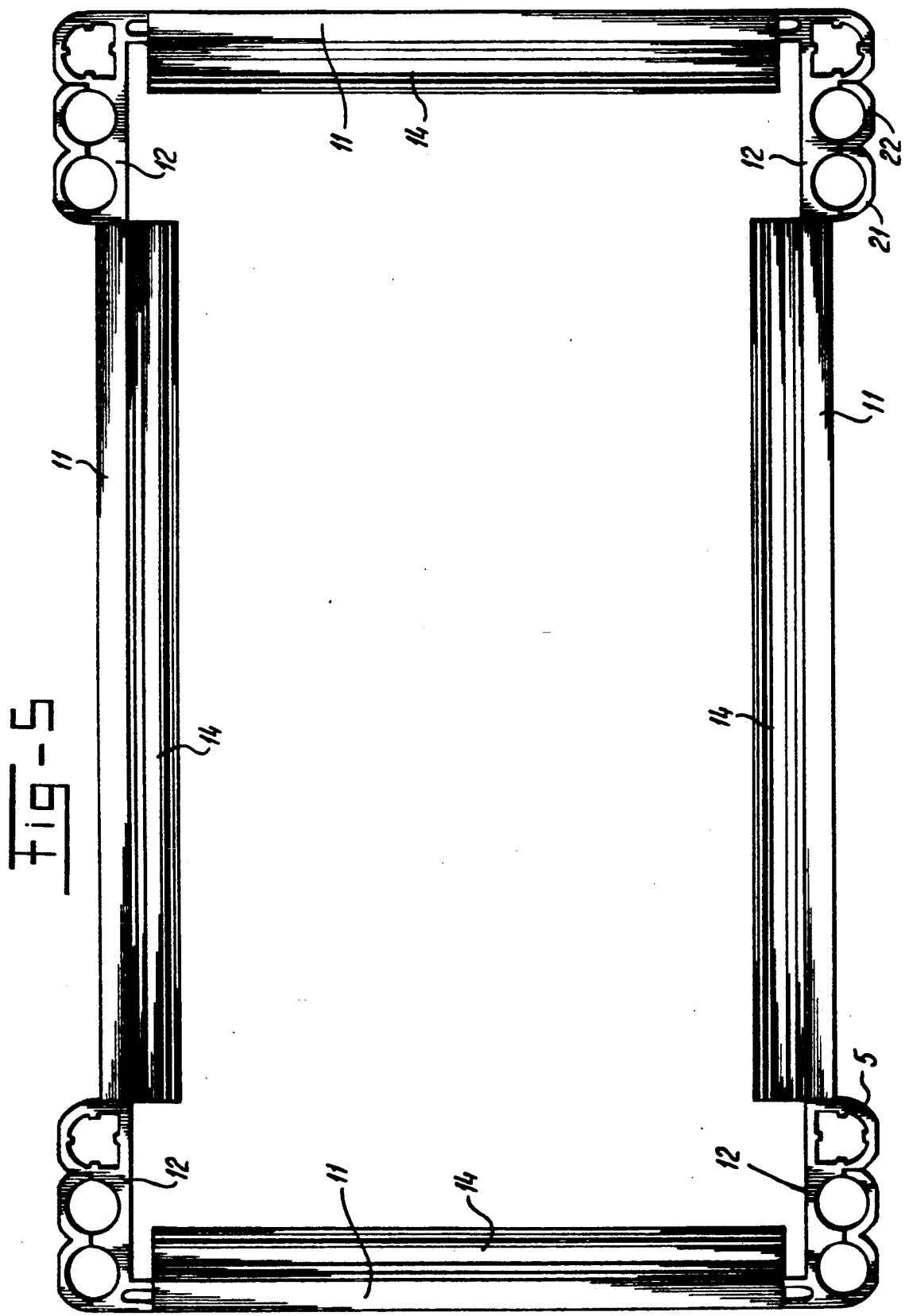
FIG. 5 shows a top view of a first embodiment of a table frame.
Figure 6:
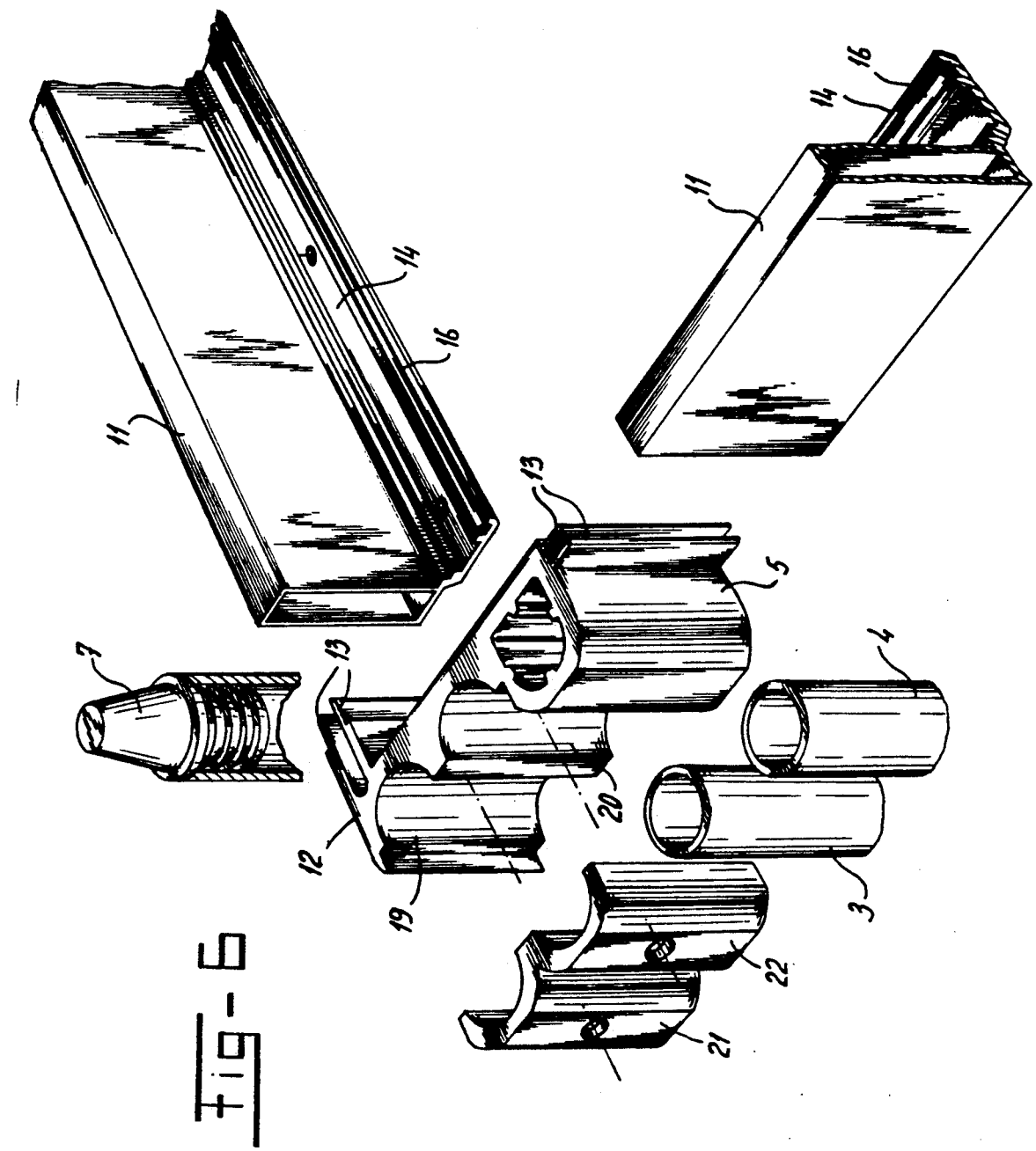
FIG. 6 shows a perspective view of a part of the first embodiment of the table in the disassembled state.
Figure 7:
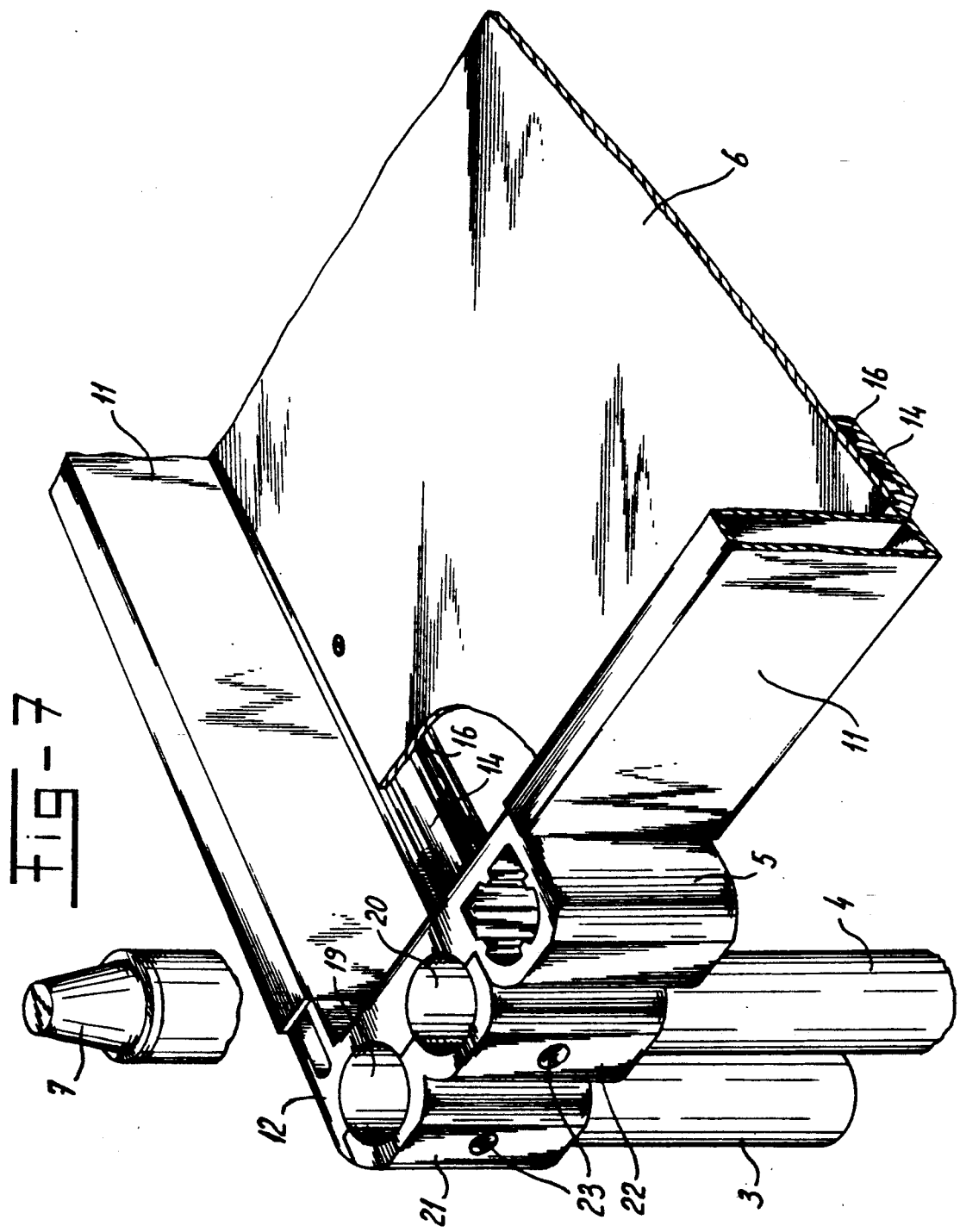
FIG. 7 shows a perspective view of the table according to FIG. 6 in the assembled state.
Figure 8:
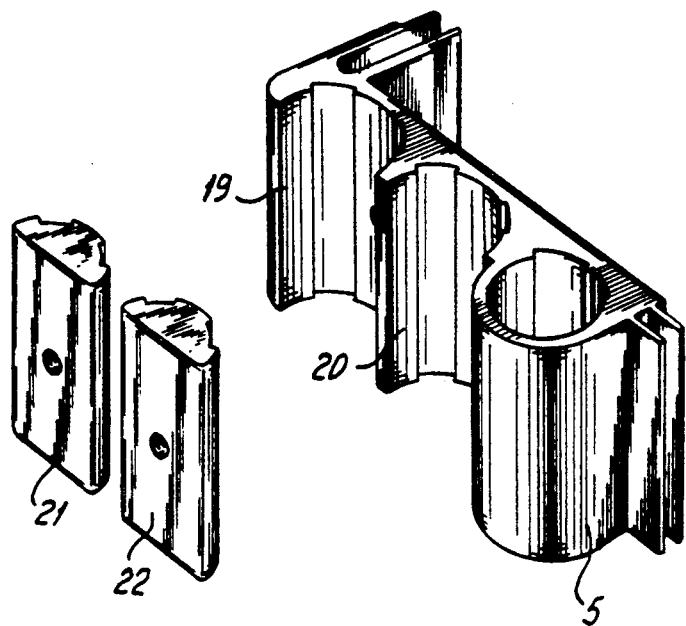
FIGS. 8 and 9 show perspective views of a corner section of a table according to a second embodiment, in the disassembled and the assembled state respectively.
Figure 9:
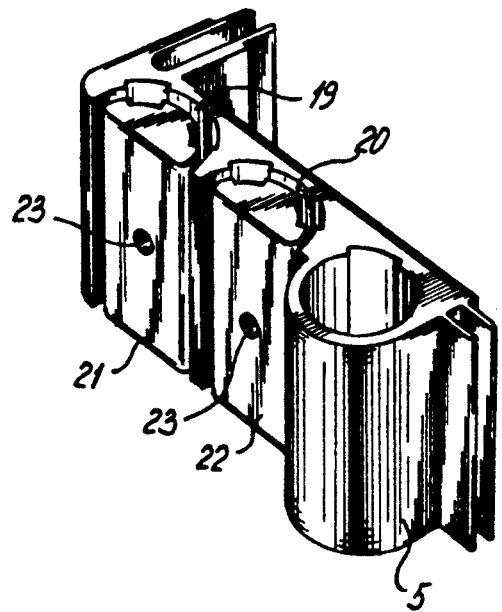

FIGS. 5 to 10 show possible construction details. Each table has a frame consisting of four rectangular tube profiles 11 and four corner pieces 12. The corner pieces possess projecting sections 13 which are pushed into a tube profile 11 and welded thereto. Each tube profile 11 has an inwardly projecting flange 14. The table top 6 lies on the flanges 14 of the four tube profiles 11. To seal the table top with respect to the frame consisting of the tube profiles 11 and corner pieces 12, the flanges 14 in the embodiment according to FIGS. 5 to 7 are provided with a sealing strip 16 of elastomer material or cement. In the embodiment according to FIG. 10, a V-shaped rubber flap 17 seals the gap between the table top 6 and the tube profile 11. The flap 17 has a section 17' which is clamped between the flange 14 and the table top 6. The flap 17 is also held in place by a boss 18 of the tube profile gripping on an edge of the rubber flap.

The corner pieces 12 comprise the receiving element 5, which is designed as a pipe piece, and two semi-cylindrical recesses 19, 20, which are intended to receive a leg 3 and a support rod 4 respectively. The legs 3, support rods 4 and semi-cylindrical parts 19, 20 are provided with an opening, so that each leg and each support rod can be secured in the desired position by means of a setscrew 23, which projects through a clamping piece 21 and 22 respectively. The clamping pieces 21, 22 are in the form of semi-cylindrical dishes in the embodiment according to FIGS. 5-14 7 and in the form of semi-circular solid parts in the embodiment according to FIGS. 8 and 9. The corner pieces 12 can also be hook-shaped and project around each edge of the table.

By providing the legs 3 and/or the support rods 4 with two or more openings sited above one another, the height of said ledges and/or rods can be made adjustable.

Of course, the legs 3, the supports rods 4 and the receiving elements 5 of a table can also be secured in another manner, for example directly to the frame or to the table top, for example by welding. They must be positioned in a straight line in each unit, but can be fitted in a right-angle pattern.

The essential feature of the inventive concept is that a number of tables provided with legs can be stacked in a stable manner on the mobile sub-frame 1 of a trolley. These tables can be placed, with the goods (flowers and plants) standing thereon, on the floor in a shop. The distance between the individual table tops is variable with the aid of support rods and receiving elements. The tables can also be triangular, pentagonal or hexagonal or with more sides, and can even be circular or elliptical.

I claim:

1. Stacking trolley comprising a mobile sub-frame with a number of tables fitted thereon above one another, said tables each having a tray (6) forming a table top, and legs (3), there being in the vicinity of each leg (3) a vertical support rod (4), of each set consisting of one leg and one support rod one projects both above and below the tray with the portion projecting below the tray having a vertical length substantially different from the vertical length of the other of said leg and supporting rod, such that several intervals between the trays can e obtained by placing leg or support rod portions projecting below the tray of a table on leg or support rod portions projecting above the tray of a subjacent table.

2. Stacking trolley according to claim 1, wherein each table is provided in the vicinity of each leg (3) and support rod (4), with a tube-shaped receiving element (5) for receiving the upper end of a support rod (4) of a subjacent table or for receiving the lower end of a leg of a superposed table.

3. Stacking trolley according to claim 1, wherein each said support rod (4) projects below the table top a vertical distance which is less than the vertical length of the portion of a leg (3) projecting below the table top.

4. Stacking trolley according to claim 1, wherein each leg (3) projects to above the table top a vertical distance which is less than the vertical length of the portion of a support rod (4) projecting above the table top.

5. Stacking trolley according to claim 1, wherein the sub-frame has vertical support rods (9) to support a lowermost table (2).

6. A stackable table, comprising a tray forming a table top, legs, and in the vicinity of each leg a vertical support rod (4), wherein of each set consisting of one leg and one support rod one projects both above and below the tray, and the upper end of leg or support rod portions projecting above the tray and the lower ends of leg and support rod portions projecting below the tray having complementarily shaped male and female portions (5), said lower ends extending substantially different vertical distances below the tray.

7. Table according to claim 6, which is polygonal and at each corner is provided with two recesses (19, 20), in one of which a table leg (3) is secured and in the other of which a support rod (4) is secured.

8. Table according to claim 7, wherein at said corners the table also has a tube-shaped receiving element (5) into which fits a male element (7) at the upper end of a support rod (4) of a subjacent said table.

9. Table according to claim 7, wherein the recesses (19, 20) at the corners are provided in a corner piece of which projecting end sections (13) are each incorporated in a rectangular tube profile (11), said tue profiles forming upright side edges of the table.

10. Table according to claim 9, wherein the tube profiles (11) have an inwardly directed flange (14) to support the tray.

11. Table according to claim 10, wherein the flange has a sealing profile (16).

12. Table according to claim 10, further comprising a substantially V-shaped sealing strip (17) that grips a peripheral edge of the tray (15), which sealing strip has a fixing lip (17') which rests on the flange (14) underneath said peripheral edge strip.

13. Table according to claim 7, wherein a leg (3) and a support rod (4) are secured in the recesses (19, 20) of each corner piece by clamping pieces (21, 22) which are fixed with the aid of fasteners (23).

14. Table according to claim 13, wherein the legs (3) and the support rods (4) have at least two openings spaced apart lengthwise thereof in order selectively to receive said fasteners (23).

* * * * *